Dec. 19, 1944.    W. H. STOUT    2,365,226
BACK-UP BAR
Filed April 5, 1943    4 Sheets-Sheet 1
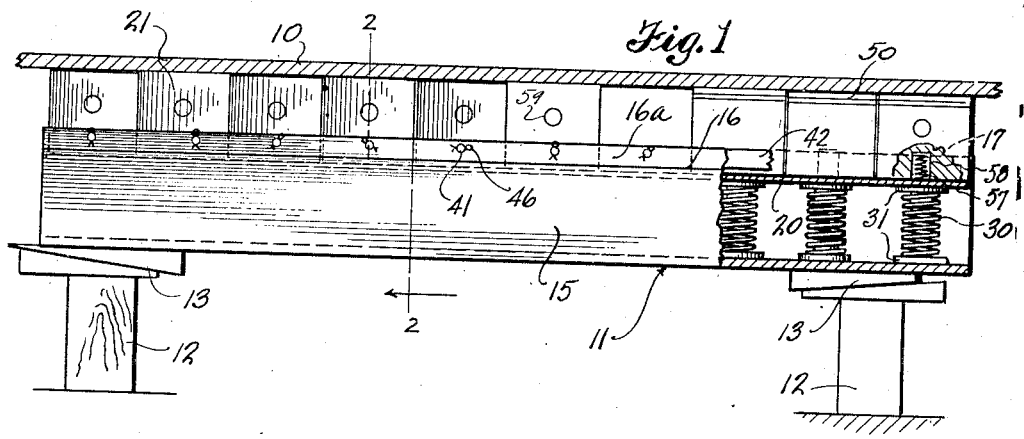
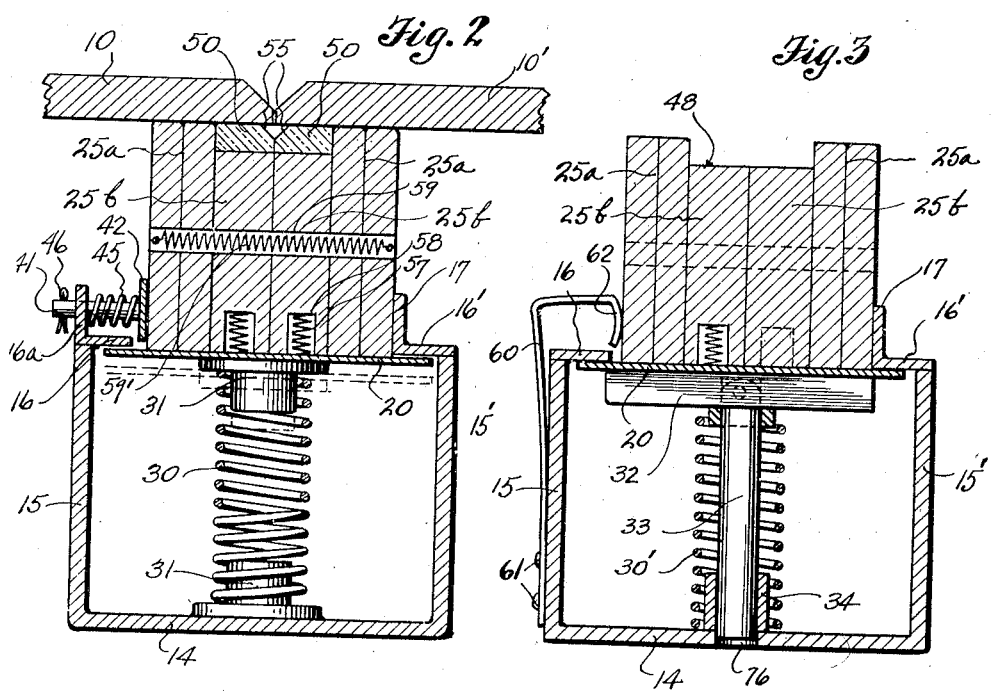
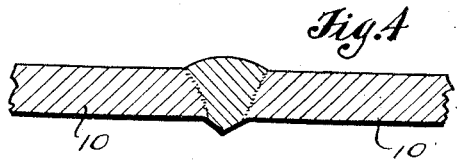
INVENTOR
W. H. STOUT
BY
Cook & Robinson
ATTORNEY Dec. 19, 1944.  W. H. STOUT  2,365,226
BACK-UP BAR
Filed April 5, 1943  4 Sheets-Sheet 2
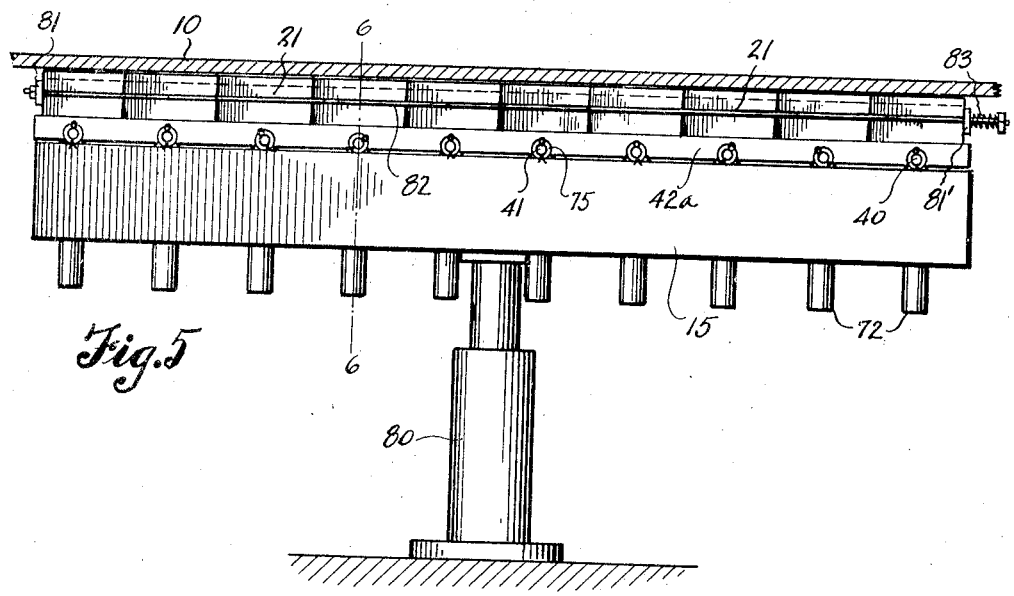
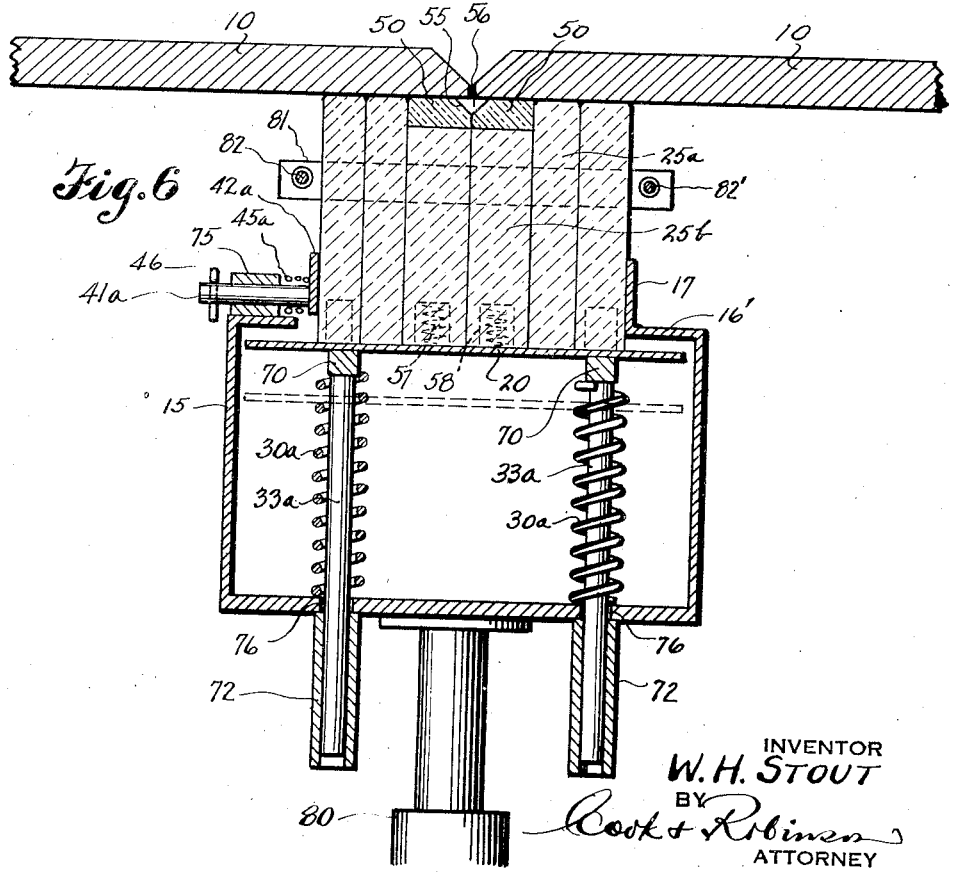
INVENTOR
W. H. STOUT
BY
Cook & Robinson
ATTORNEY Dec. 19, 1944.　　　　W. H. STOUT　　　　2,365,226
BACK-UP BAR
Filed April 5, 1943　　　　4 Sheets-Sheet 3
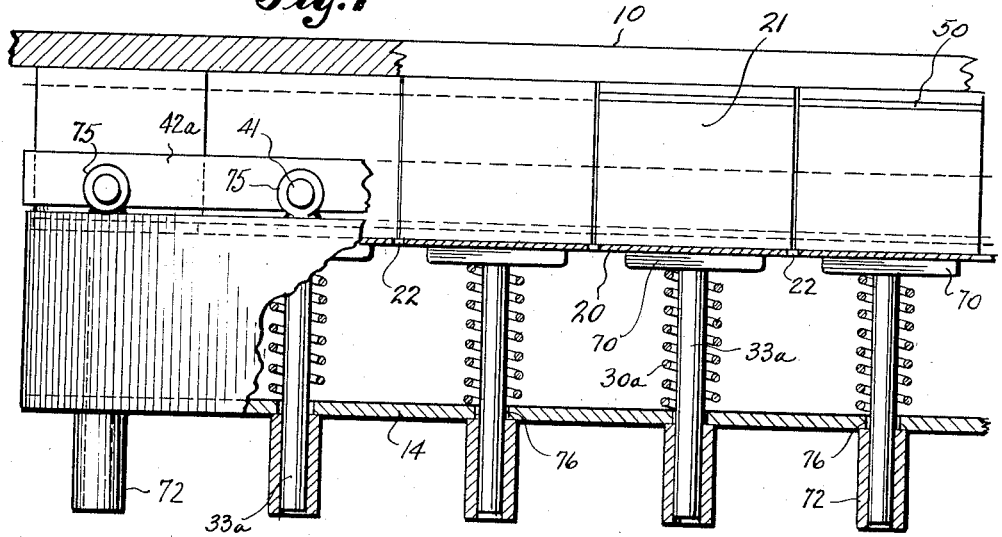
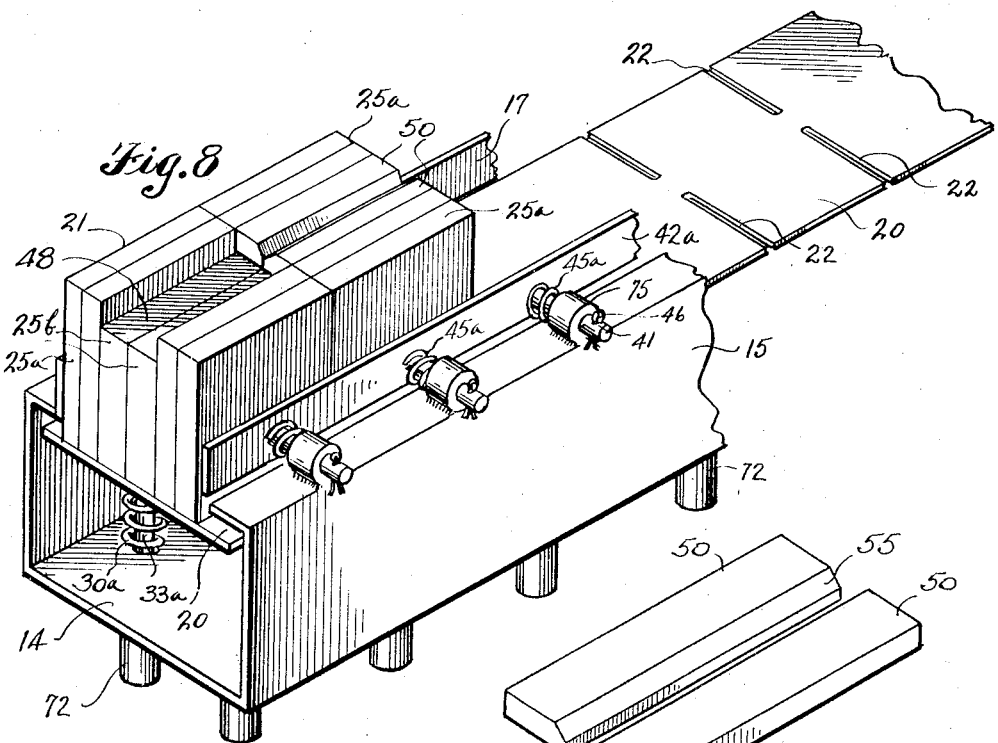
INVENTOR
W. H. STOUT
BY
Cook & Robinson
ATTORNEY

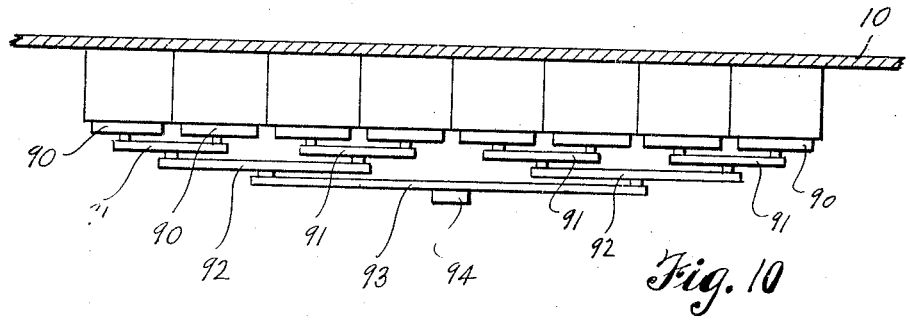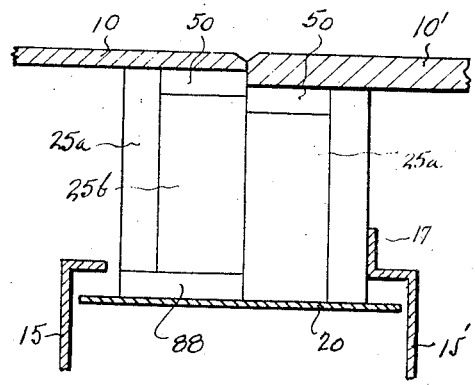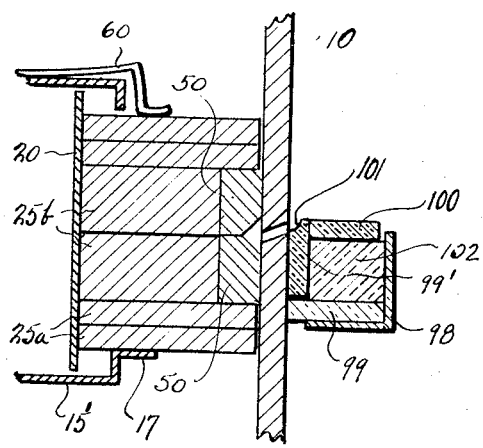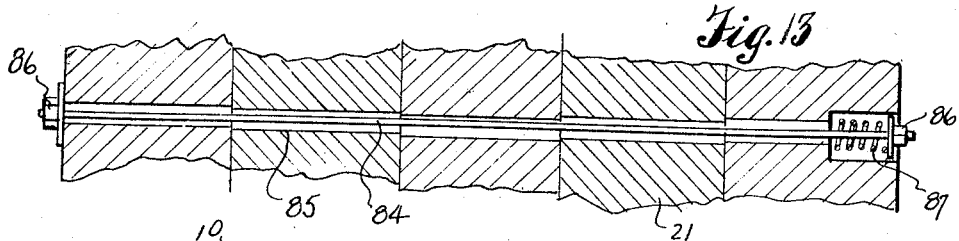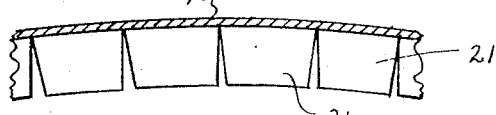

Patented Dec. 19, 1944

2,365,226

UNITED STATES PATENT OFFICE 2,365,226

BACKUP BAR

William H. Stout, Portland, Oreg.

Application April 5, 1943, Serial No. 481,862

12 Claims. (Cl. 113—111)

This invention relates to improvements in "back up" bars as used in welding operations, and it has reference more particularly to articulated bars designed to retain the molten metal between the edges of plates to form the weld.

Explanatory to the present invention, it will here be stated that in the operation of butt welding the edges of deck plates, or hull plates, such as used in steel ship construction, and in similar constructions, it is common practice, preparatory to welding, to bevel the edges of the plates in such manner that when brought together, a trough or channel will be formed along the joint. In this channel, a filler material and flux is placed, then the welding arc or flame is directed into the trough to bring about the melting of the plate metal along the beveled surfaces and also the melting of the filler material; this molten metal being retained in the trough to form the weld as is well understood in the art.

It is desirable also, for strength and durability, that a bead be formed along the seam at the side opposite the weld, and to form this bead it is necessary to retain the molten metal by use of a "back up" bar. Otherwise the molten metal would merely pass through the seam and the weld would be defective. It is desirable in some instances that the plates be beveled or chipped out along the seam at the side opposite the weld to insure a better connection or weld.

It is now common practice to use flat copper plates or bars as "back up" bars, because of their flexibility and because molten steel does not stick to copper. However, the use of copper has been somewhat unsatisfactory for various reasons, some of which are: that copper melts at from 1,000° to 1,100° C. and steel melts at from 1,500° to 1,600° C., and therefore great care must be exercised to avoid melting the copper. Furthermore, if in electric welding the arc should strike the copper bar, a hole would be made therein, which would ruin the bar.

In view of the fact that plates being welded together invariably will warp to a greater or lesser extent under the welding heat, it is essential that the back-up bar always conform or adapt itself to the warpage. Also, the holder for the bar must so apply it that it will follow either plate as it moves out of a plane. Two plates are normally "fair," that is, their plane bases normally are parallel at the time of welding, but they may become "unfair" either because of oversight, or because of warpage, or from other causes. Therefore, it is desirable that the back-up element, whatever it be, be so constructed that it can and will follow each separate plate and at the same time will not allow any molten metal to escape from the seam.

Since it is desirable in most instances to provide a bead along the seam opposite the weld, attempts have been made to form this bead by use of powdered or granulated material applied in the seam, but this is not satisfactory because heretofore it has not been possible to predetermine the approximate shape and size of the bead. Furthermore, because of the warpage of the plate as mentioned above, it has not been considered possible to use unbendable materials for a back-up bar although such materials are in some cases most desirable from the standpoint of heat resistance and durability.

In view of the desirability or necessity for use of back-up bars, and in view of the above mentioned and other difficulties now attendant to the usual seam welding operations where present-day bars or backing plates are employed, it has been the principal object of this invention to provide a back-up bar that may be made to readily conform to the warpage of plates and which will retain tight connection therewith along both sides of a seam regardless of any buckling or warping that results from the application of welding heat.

Another object of the invention is to provide a backing bar that enables the operator of the welding machine to weld clear down through the edges of the abutted plates and to form the bead on the opposite side of the plate, thus eliminating the present required work of hand grooving the opposite side of the weld and the hand weld finish now practised.

Still another object of the present invention is to provide a back-up bar that is composed of a succession of articulated units of non-bendable material, arranged for disposition along a seam, and wherein each of said units is composed of articulated members which permit them to readily conform to any "unfair" relationship of plates at opposite sides of the seam.

More specifically stated, the objects of this invention reside in the combination of an articulated back-up bar, as above stated, with an elongated, box-like frame with which a jack, or wedge may be associated for supporting the frame along the seam that is to be welded and in which frame is a longitudinally extending flexible and yieldably supported plate, upon which the articulated units of the back-up bar are supported; the plate being urged upwardly by springs or the like, thereby to retain the bar tightly against the plates and the bar, by reason of its being composed of articulated units, being adapted to conform readily to the warpage of the plates along the seam and the units to maintain contact with the plates at opposite sides of the seam, thus to retain all molten metal in the seam during the welding operation.

Still further objects of the present invention reside in the details of construction of the bar; in the joining and assembly of the units; in the construction of the frame and yieldable supports; and in the mode of use of the device, as will hereinafter be fully described.

In accomplishing these and other objects of the invention, I have provided the improved details of construction, the preferred forms of which are illustrated in the accompanying drawings, wherein—

Fig. 1 is a side view of one form of the present backing device as applied for use along a plate seam, a part being broken away for better illustration.

Fig. 2 is an enlarged, cross sectional view on the line 2—2 in Fig. 1.

Fig. 3 is a similar cross sectional view of a device of an alternative form of construction.

Fig. 4 is a sectional view of a finished welded seam.

Fig. 5 is a side view of a device of an alternative form as supported in use by a jack.

Fig. 6 is an enlarged cross section on line 6—6 in Fig. 5.

Fig. 7 is a side view and partial longitudinal section of a portion of the device.

Fig. 8 is a perspective view showing a part of the device and some of the insulating blocks and bead molding refractories.

Fig. 9 is a perspective view of one set of the paired bead shaping refractories used with the device.

Fig. 10 is a side view of a back-up bar having another means of support.

Fig. 11 is a sectional detail showing the use of the bar in welding a horizontal seam on a vertical wall plate.

Fig. 12 shows, in cross section, a back-up bar as used in the butt welding of plates of different thickness.

Fig. 13 is a detail showing means for holding the bar segments together.

Fig. 14 shows the shaping of segments to provide for curvature of the bar.

Referring more in detail to the drawings—

In Fig. 2, deck plates, or the like, are designated by reference numerals 10 and 10', and they are shown in "fair" relationship preparatory to the making of a butt weld. Applied against the plates at the under side thereof, is one type of back-up bar embodying the present invention; this being designated in its entirety in Fig. 1 by reference character 11. The back-up bar, or backing equipment as there shown, comprises an elongated metal frame structure of box-like form, functionally supported at its opposite ends by means of the blocks 12 and wedges 13.

The frame structure, as noted in Fig. 2, is of channel-like form and comprises a horizontal bottom wall 14, and vertical opposite side walls 15 and 15'; these side walls either being integral with, or fixed solidly to the bottom wall, and are equipped along their upper edges, respectively, with inturned horizontal flanges 16 and 16'. At one side of the channel-like housing, the inturned flange 16' is formed along its inner edge with a vertical flange 17, for a purpose presently disclosed. The horizontal flange 16' and the vertical flange 17 may comprise a bar of angle iron that is welded to the top edge of the side wall, as illustrated in Fig. 2. Likewise, the flange 16 may be the horizontal flange of a bar of angle iron, welded to the top edge of wall 15 flush with the wall surface as shown at the right-hand side of Fig. 2, leaving the vertical flange 16a of the bar for a purpose presently explained.

Disposed within the channel frame that is comprised by the bottom wall 14, side walls 15 and 15' and inturned flanges 16 and 16', is a horizontal plate 20 that is coextensive with the frame and serves to support thereon the bar proper which is made up of a succession of blocks, or sections 21 of insulating material. The plate 20 is of thin, flexible sheet metal and to give additional flexibility thereto, it is formed at relatively close intervals along its opposite longitudinal edges, with deep cut slits 22. The slits 22, at opposite sides of the plate are evenly spaced and are in transverse alinement as noted in Fig. 8, and their spacing in a direction measured longitudinally of the plate is equal to the length of the individual sections or blocks 21 of insulating material supported thereon. Also, it is to be understood that the transverse joints between the successive blocks 21 of insulation as arranged upon the plate 20, coincide with transversely alined slits 22 in the plate.

The plate 20 is yieldingly supported at regularly spaced intervals. In the device as illustrated in Figs. 1 and 2, it is supported centrally along its length by means of coiled springs 30, and it is there illustrated that each of these springs is seated at its ends about vertically alined flange nipples 31 that are fixed on the under side of plate 20 and upon the bottom wall 14.

In a modification of the device as shown in Fig. 3, cross bars 32 are engaged against the under side of plate 2 at regular intervals, which would be intermediate the cross slits 22, and posts or rods 33 are fixed pivotally at their upper ends to these cross bars 32 and extend downwardly therefrom and through tubular guides 34 fixed on the bottom wall. Coiled springs 30' are applied about the posts under compression between the bars 32 and wall 14. In each device, as shown in Figs. 2 and 3, the upward movement of the plate 20 is limited by contact of its longitudinal edge portions with the frame flanges 16 and 16' and its downward movement is limited to the compressibility of the springs.

Extended horizontally through the vertical flange 16a of the angle bar in which the flange 16 is embodied, and at regular intervals therealong are short posts 41 which at their inner ends support a horizontal, flexible metal strip 42 designed to engage flatly against the adjacent sides of the succession of blocks 21. Coiled springs 45 are placed under compression about the posts 41 and these are held under compression between the flange 16a and the strip 42 to urge the latter inwardly; the purpose of this being to hold the blocks alined and their laminations tightly together.

It will be understood by reference to Figs. 1 and 2, that the blocks 22 of insulation are arranged in juxtaposition upon the plate 20 and at one vertical side, each is disposed flatly against the vertical flange 17, and at their opposite sides, they are engaged by the strip 42. The blocks are thus clamped by the pressure of the springs

45 securely between the strip 42 and flange 17, but not so tightly as to prevent the relative vertical adjustment of blocks or movement of laminations, as will presently be described.

Cotter keys 46 are extended through the outer ends of the shafts 41 to retain them in the flange 16a when the blocks 21 are removed from the frame.

Referring now to Figs. 2, 3 and 5, wherein the succession of blocks or sections of insulation 22 are shown more in detail, it is to be observed that each block is made up of paired rectangular opposite outside sections, or laminations designated by reference characters 25a—25a, and two intermediate or inside sections 25b—25b. All of these sections are of the same length but the laminations of the outside sections are somewhat higher than those of the inside sections, thereby providing that with the blocks assembled as in Fig. 1, a longitudinal trough 48 will be formed the length of the bar. In this trough, paired bead molding refractories 50—50 are retained. These refractories may be molded of clay, soap-stone, or any other heat resisting material suitable for the present purpose, and they are in strip form, relatively short in length and are placed in the trough 48 lengthwise thereof, end to end, and edge to edge, as noted in Fig. 8. The adjacent edges of the refractories are beveled along their top corners, as at 55 in Fig. 9, to cooperate in forming a V-shaped trough 56 in which to mold the bead of the weld along the under side of the joint or seam.

In using the present device, the frame is applied along the joint at the under side of the plates, with the groove or trough formed by the paired refractories 55 coinciding with the plate joint. Then the supports 12 and 13 are so applied as to lift the frame and cause the top surfaces of all sections of insulation to be pressed upwardly and tightly against the plates 10 regardless of any curvature or irregularity. This lifting of the frame should be to such extent that the side edges of plate 20 will be displaced to substantial disstance downwardly from contact with the flanges 16—16', as indicated by the dotted line showing of the plate in Fig. 2. Any curvature of the plates along the seam, either at the start or during a welding operation, will be compensated for in the relative movement of successive blocks, under pressure of the springs 30 or 30' and as provided for in the flexibility of the plate 20. Also, any unfairness of the plates along opposite sides of a seam is compensated for on the relative movement of the laminations 25b—25b of the individual blocks. Then in the welding of the seam, the electric arc may proceed from the top side of the plates in the usual manner. Filler metal is used as in the usual welding operations. As the metal of the plates and the filler rods are melted, the molten metal will flow to some extent down through the joint seam and will fill the mold formed by the beveled edges of the refractories, thus to form the bead along the under side of the weld. The weld may be beaded, as in Fig. 4, or made flush at the top side of the plates.

During the welding operation, should the plates 10—10 buckle or warp under the applied welding heat, the succession of insulating blocks will readily adjust themselves along the seam and the refractories will thus be retained at all times tightly against the plates and properly in place by reason of the fact that the supporting plate 20 will yield under the spring pressure, and cause the blocks 21 to conform to all changes in alinement of the plates along the seam.

To better insure the holding of the laminations of the blocks against the plate edges, springs 57 may be applied in pockets 58 in the bottom edges of the laminations, and held under compression against the bottom wall 14 of the housing, as shown in Fig. 2. Likewise, it may be desirable to bore channels 59 through the blocks, as noted in Figs. 2 and 6, and hold the parts together by coiled springs 59' fixed at their ends to the outside laminations.

Various modifications of the device might be employed without departing from the spirit of the invention. In Fig. 3, I have illustrated the device as being equipped along one side with a succession of leaf springs 60 affixed at their lower ends to the side wall 15 as at 61 with their upper end portions extended above the top edge of the wall 15 and flange 16, then turned inwardly and terminating at their ends in downwardly curved head portions 62 adapted to engage under pressure against the sides of blocks 21 to clamp them against the flange 17 for the same purpose and in substantially the same manner as is accomplished by the springs 45 and strips 42 of the device shown in Fig. 2.

In another alternative device, shown in Figs. 5 to 8 inclusive, the plate 20 is shown as being supported by two rows of coiled springs 30a, each surrounding a vertical rod 33a that is fixed at its upper end to a cross head 70 and its lower end is slidable in a guide sleeve 72 that is fixed to the bottom wall 14 of the channel housing. In this arrangement of parts, the springs 30a operate in substantially the same manner and for the same purpose as those springs 30 shown in Fig. 2 or the springs 30' shown in Fig. 3.

In the device of Figs. 6 to 8, the guide sleeves 72 extend below the wall 14, whereas in the device of Fig. 3, they are contained inside of the channel housing. In each instance, openings 76 are provided through the bottom wall 14 in alinement with the guide sleeves for the passage of the rods.

In the device of Fig. 6, the flexible strip 42a which extends along the side of the housing for the same purpose as the strip 42 in the device of Fig. 2, is supported by the studs 41a which operate through guide sleeves 75 that are welded to the flange 16 and the coiled springs 45a are held under compression between the sleeves and the strip 42 to urge the latter inwardly.

It has been shown also in Figs. 6 and 7 that the channel housing is supported in place by means of a jack indicated at 80. This may be hydraulic or of other mechanical construction. Furthermore, the jack could be eliminated and the housing might be supported by the use of blocks and wedges as is the device of Fig. 1, or by other means if this should be found more practical.

In the assembly of articulated blocks, it is the intent to provide that they may at all times conform to the curvature of the plates along a seam without opening up any joint between the edges of segments where they engage the plates. Therefore, I have formed the opposite end surfaces of each segment at a slight acute angle to the channeled surface, thus to insure that when the blocks are in close juxtaposition, the bar may be arched upwardly to a considerable extent without the joints being opened across the top surface of the bar. This construction will best be understood by reference to Fig. 14, which to a somewhat exaggerated extent, shows the beveling or sloping of the end surfaces of the segments.

Also, it is desirable that the segments of a bar be held yieldingly in close contact at all times, and to insure this, I have provided means for drawing them together.

In Figs. 5 and 6, I show a frame comprising cross bars 81—81' at opposite ends of the backup bar, engaged flatly with the outer end surface of the end segments. Extended between these cross bars, along the opposite sides of the segments, are connecting rods 82—82' with ends anchored in bar 81 and with their other ends slidable through openings in the bar 81'. Nuts are applied to the ends of these rods and springs 83 are held under compression, thereby to act against the bars 82', thus to bring all of the segments together without detriment to flexibility of the bar in maintaining it against the plates. This means of holding the segments together may be applied to any of the various forms of devices herein shown.

In Fig. 13, I have illustrated an alternative means for the retaining of the segments together. This comprises one or more rods 84 extended lengthwise through holes 85 bored in the laminations of the segments to give ample clearance around the rods. At opposite ends, the rods mount nuts 86, and coil springs 87 are applied between the nuts and an end segment to draw the succession of segments together.

It sometimes happens that plates of different thickness are welded together as has been illustrated in Fig. 12. In such event, a shim as at 88 is inserted between the base surfaces of the blocks at one side of the seam, and this shim should have a thickness corresponding to the difference in thickness of the plates. By reason of the central longitudinal division of the bar, these differences in thickness may be easily compensated for without detriment to the welding of the seam.

Another form of bar support has been illustrated in Fig. 10, wherein the succession of blocks are shown as each being mounted by a base plate 90. Then each two plates 90, in succession, are supported upon the opposite ends of bars 91. The bars 91, in succession, are supported at their centers upon the ends of bars 92 and the bars 92 are similarly supported by a bar 93, which is held up by a central support 94, which might be a spring steel member, jack or block. The segments, or blocks, as here arranged, may be tied together by the frame means as shown in Fig. 5.

In Fig. 11, I have illustrated the manner of applying the present bar to a horizontal seam in a vertical wall. In this use of the back-up bar, it is applied along the seam at one side of the plates, and along the other side of the plates, articulated refractories are supported in an angle bar 98 which supports a bottom refractory 99, on which a flat strip refractory 99' is held by an outer refractory 100. The strip has a groove 101 in its top edge coinciding with the seam or joint and outside of this is a non-conductive refractory 102. In use of this, the filler material is placed in the groove 101. The refractories 99 are articulated according to the articulation of segments in the bar so as to retain close contact with the plate.

In the construction of back-up bars of the present character, especially those of Figs. 1 and 5, the channel support may be made of any suitable length, the present one being approximately four feet long. However, this is a matter to be based upon requirements or facility of use of the device. The segments 21 are approximately three inches long and the materials of which they are constructed permits them to adjust themselves easily, one upon the other so that they readily may change and conform to the contour of the plates against which they are pressed by the action of the springs 30.

In view of the fact that various modifications might be employed without departing from the spirit of the invention or the mode of use of the device, it is not intended that the claims shall be restricted to specific details of construction, but that they shall be given an interpretation commensurate with the scope of the invention that has been disclosed.

Having thus described my invention, what I claim as new therein and desire to secure by Letters Patent is:

1. A back-up bar for use in seam welding, comprising a succession of separate relatively movable articulated segments, a rigid support for the bar, whereby to hold it against a seam during a welding operation, pressure means in the support arranged to act on the bar to retain the segments in close conformity with the seam, and means for applying yielding pressure against the ends of the bar to press the segments together.

2. A back-up bar for use in welding comprising a succession of articulated, non-metallic segments, a rigid support for the bar, a flexible support for the segments, and resilient means associated with the rigid support and acting against the flexible support to act on the segments to cause the bar, through the articulation of its segments, to retain close conformity with the plates during a welding operation.

3. A back-up bar for use in welding, comprising a succession of juxtaposed, non-metallic segments of block-like form, a rigid support of channel form containing the bar within the open side thereof, and whereby the bar may be held against a seam to be welded, a flexible carrier strip within the support mounting the bar segments thereon, and pressure means in the support acting against the carrier strip to retain all of the articulated segments in contact with the seam during a welding operation.

4. A back-up bar for use in the butt welding of metal plates comprising a succession of juxtaposed, non-metallic segments of block-like form, a rigid support of channel form containing the bar within the open side thereof, a flexible carrier strip within the support mounting the bar segments thereon, pressure means between the carrier strip and support adapted to urge the bar against the plates during a welding operation, and springs disposed under compression between the individual segments and the carrier strip to cause all segments to retain close contact with the plates during a welding operation.

5. A back-up bar for use in the butt welding of metal plates comprising a succession of juxtaposed, non-metallic segments of block-like form, a rigid support of channel form containing the bar within the open side thereof, a flexible carrier strip within the support mounting the bar segments thereon, pressure means in the support acting against the carrier strip to urge the bar outwardly from the channel support to retain all of its articulated segments in contact with the plates, means for limiting the bar lifting movement of the flexible carrier and a yielding pressure means engaging the ends of the bar to retain the segments in close contact in the supporting channel.

6. A back-up bar for use in the butt welding of metal plates comprising a succession of juxtaposed, non-metallic segments of block-like form, a rigid support of channel form containing the bar within the open side thereof, a flexible carrier within the support mounting the bar segments thereon, pressure means in the support acting against the carrier to urge the bar outwardly from the channel support to retain all of its articulated segments in contact with the plates; said segments of the bar having the end surfaces thereof lying in planes at acute angles to their plate engaging surfaces, to permit upward arching of the bar without opening the joints between segments at the seam.

7. A back-up bar for use in seam welding comprising a succession of juxtaposed articulated segments of block-like form; each segment being longitudinally divided to provide for relative inward or outward movement of the parts thereof at opposite sides of the division, a support for holding the bar along a seam, and means acting on the parts of the divided segments to press them against the plates along opposite sides of the seam.

8. A back-up bar for use in the butt welding of metal plates comprising a succession of non-metallic, rigid segments of block-like form, each segment being centrally divided in its longitudinal direction, a rigid support of channel-like form containing the bar segments in articulated juxtaposition in the open side thereof, means on the said support and yieldingly pressing against the sides of the segments to maintain them in assembled relationship therein, and yielding means associated with the support and acting against the segments individually to urge them outwardly to conform to irregularities of and to changes in contour of the plates along a seam during a welding operation.

9. A back-up bar for use in the butt welding of metal plates comprising a succession of juxtaposed articulated segments, a rigid support for holding the bar along a seam for a welding operation; said segments being longitudinally divided to provide for relative inward or outward movement of the parts thereof at opposite sides of the division to individually retain close contact with the plates at opposite sides of a seam, means acting against the ends of the bar to hold the segments in close contact, yieldable means acting against the sides of the segments to retain the parts thereof in close contact and means mounted in the support and acting against the segments to press them against the plates.

10. A back-up bar of the character described comprising a succession of juxtaposed, articulated segments of block-like form, each formed with a channel in its top surface and said channels of all segments being in alinement, and providing a channel extending the length of the bar; each of said segments being longitudinally divided in the channel and having bead molding refractories seated in the said channel thereof and terminating at the joint which provides for the articulation of segments and longitudinally divided along the line of division of the segments.

11. A back-up bar of the character described comprising a succession of juxtaposed, articulated segments of block-like form, each formed in its top surface with a channel, and said channels of all segments being in alinement and providing a continuous channel the full length of the bar; each of said segments being longitudinally divided along the central line of the bar, and complemental bead molding refractories seated in the channel of each segment and divided along the line of division of the segments; said refractories providing a continuous groove for molding of a bead along a welded seam, and means for supporting the segments and the divided parts thereof against the plates along a seam to be welded.

12. A back-up bar of the character described comprising a rigid support of channel-like form with inturned flanges along the edges of its opposite side walls, a succession of juxtaposed segments of block-like form arranged in the open side of the supporting channel, a flexible supporting plate for the blocks, springs between the plate and base of the supporting channel bar; said plate being adapted to be limited in outward movement by contact of its edges with the said inturned flanges, and having slits therein extending from its side edges to near the center line, and coinciding with the transverse division between segments, and a clamp bar mounted on the support along one side of the segments, means for causing said bar to bear yieldingly against the segments to retain their assembled relationship in the support.

WILLIAM H. STOUT.